United States Patent Office 3,119,884
Patented Jan. 28, 1964

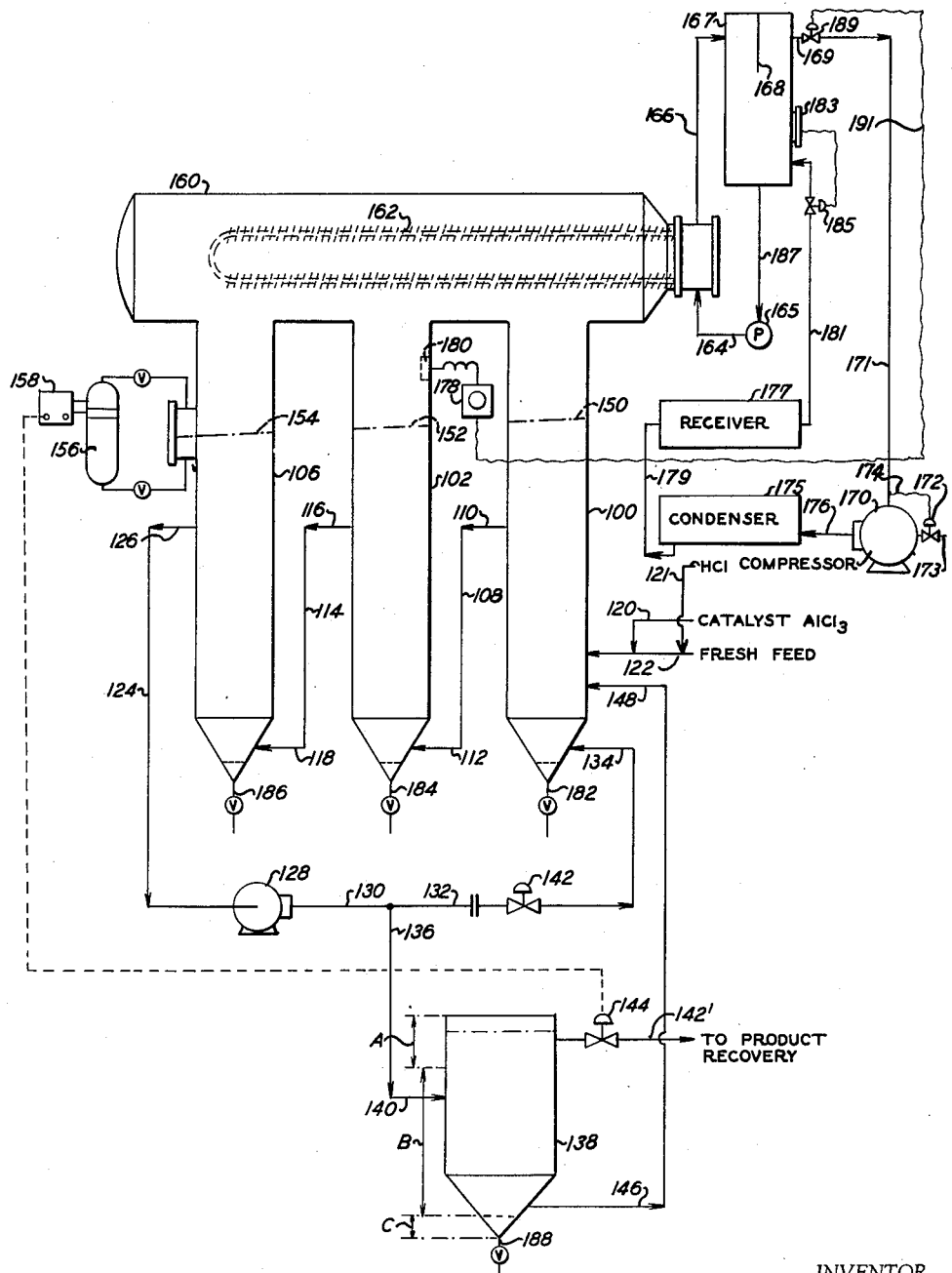

3,119,884
REACTOR AND METHOD FOR POLYMERIZING OLEFINS
Jerry R. Allen and Dan M. Krausse, Big Spring, Tex., assignors, by mesne assignments, to Cosden Oil & Chemical Company, Big Spring, Tex., a corporation of Delaware
Filed Mar. 27, 1958, Ser. No. 724,280
4 Claims. (Cl. 260—683.15)

This invention relates to a reactor useful for various exothermic reactions in which a catalyst is suspended in a vaporizable liquid, but is particularly useful for polymerization of liquified gases continuously circulated through said reactor with a catalyst suspended therein. The invention further relates to a process of handling circulating liquified gases and catalyst for continuous temperature controlled catalytic reaction. More particularly the apparatus and method is usefully applied in reactions to cool the reaction components by reflux of vaporized gases and thereby maintain a constant temperature of the reaction components as well as relatively constant composition or concentration relationship. The present reactor construction and method is particularly useful in a system for polymerizing liquified olefinic gases such as isobutylene usually with catalyst suspended therein and in other continuous liquid and gaseous flow systems in which the reactor is useful to maintain the temperature and composition of the reaction components substantially constant at a desired reaction temperature while being circulated therethrough.

This reactor and method, while having other uses as indicated above, is adapted as an improvement upon that described in the system for continuously polymerizing isobutylene as set forth in a copending application of William K. Jackson, Serial No. 606,418, filed August 27, 1956, now Patent Number 2,957,930, issued October 25, 1960, assigned to the same assignee as the present application. In that copending application of William K. Jackson, a method and apparatus is disclosed for continuous polymerization of isobutylene contained in a $C_1$–$C_5$ petroleum gas mixture which usually contains other olefines. The isobutylene contained in that gas is preferentially polymerized in the presence of other polymerizable olefines by passing the liquified $C_1$–$C_5$ feed gas continuously through a reactor at a variably desired temperature in the range of —40 to +65° F. and a pressure of 0 (atmospheric) to 150 lbs. p.s.i.g. together with a catalyst, which for this reaction is preferably finely divided aluminum chloride particles of a critical particle size suspended in the liquified feed gas reaction mixture passed through the reactor while simultaneously feeding a relatively smaller quantity of hydrochloric acid gas or a substance which forms this. The reaction mixture after reacting is withdrawn to separated catalyst settling tank or one which may be superimposed above the outlet of the reactor itself, which for this purpose is a vertical reaction column. After withdrawal of the reaction mixture from the reactor, a portion is separated by settling for polymer recovery and a larger proportion of the reaction product in more than 8 to 1 ratio and preferably at least 10 to 1 of the reaction product to the fresh liquified feed stock to the portion separated from catalyst for further purification, is recycled to the inlet of the reactor together with fresh liquified gas and catalyst. This polymerization reaction is exothermic and the reaction to produce polymer takes place continuously in the reactor in the presence of the catalyst, evolving a substantial amount of heat which must be withdrawn from the system by refrigeration. In that copending Jackson application the reaction product withdrawn from the reactor and recycled is passed through a refrigeration unit and cooled prior to returning to the reactor for purposes of withdrawing the exothermic heat of reaction.

It is desirable in producing polymerized olefines such as polyisobutylene, to maintain the temperature of the reaction at an accurately fixed level in the reactor, inasmuch as the characteristics of the polymeric product produced, such as its molecular weight and viscosity, will vary substantially with variations in temperature. Such temperature control has been quite difficult to effect in a continuous flow exothermic reaction process.

Some efforts in the art to maintain such temperature control by cooling the reactor itself, such as by jacketing the reactor or mounting cooling coils within the reactor and passing refrigerant through the jacket or coils, have been unsuccessful to both rapidly remove the large quantities of exothermically evolved heat rapidly released in the reaction and maintain the temperature of the reaction mixture substantially constant. Moreover, such systems have not been flexible to maintain adequate refrigeration to control the temperature of reactants under rapid heat release conditions and particularly where the rate of flow of reaction components to the reactor is at a high rate and is also desirably varied. Other proposals in the art, generally for batch operation, to allow some of the liquified gases fed to the reactor to evaporate rapidly, removing the same from the system, for maintaining by evaporation refrigeration the temperature control of the reaction mixture, undesirably changes the concentration relationships of reaction components in the reactor. The quantity of catalyst and surface area thereof exposed to reaction components comprising the recycle and initial optimum feed to the reactor, also become changed, whereby such prior systems which include evaporation have been impractical and generally inadequate in a continuously reacting and continuous flow system.

A further problem in the art which is solved by the present invention is the difficulty of carrying out a continuous catalytic reaction wherein the catalyst is suspended as fine particles in a liquid reaction medium and which are sized to ultimately be separated from the reaction mixture by settling. While it would appear that undesirable premature catalyst settling from suspension within the reactor itself could be overcome by increasing the flow velocity of reaction mixture therethrough, this results in inadequate time in the reactor for substantial reaction to be effected as well as for desired heat exchange.

One object of this invention is to provide a reactor in which vapors, from volatilized liquid reagents, including a catalyst, evolved by exothermic heat of reaction while continuously passing through the reactor, are continuously condensed in heat exchange upon cooling coils in the reactor, continuously returning as condensed liquid reflux to the liquid reaction medium. This evaporation and condensation of evolved vapors, in contact with cold refrigeration coils, cools and maintains the temperature of the liquid reaction mixture substantially constant, and also maintains the concentration relationship between reaction components substantially constant except by the desired polymerizing of these components, whose composition otherwise would be substantially modified by the loss of evaporating vapors.

A second object is to provide a reactor through which a suspension of catalyst solids in liquid reagents is flowed in a manner to have an upward component of velocity sufficient to maintain the catalyst suspended to prevent settling of catalyst within said reaction medium.

A further object is to provide a series of multiple vertical towers combined with one or more reflux returning heat exchangers whereby a suspension of catalyst in vaporizable liquid reaction medium may be maintained suspended therein for a desirable reaction period, and which will provide a desirably large surface area for separation of liquid and vapor phases with low liquid and solids entrainment in the vapors.

A further object of this invention is to provide a reactor to form low molecular weight liquid isobutylene polymer of the type described in said copending application, with, however, improved efficiency.

Other benefits of this reactor construction and process in which it can be used will be inherent in the ensuing description of the apparatus and its use in a process for polymerizing liquified olefine gas, particularly a $C_1$–$C_5$ olefine containing gas, including isobutylene, which is made with reference to the drawing in which the single figure illustrates diagramamtically the reactor and auxiliary units used therewith in the production of polybutylenes.

As shown, the reactor comprises a first reaction column 100 of a series, a second reaction column 102 of the series and a third reaction column 106 of the series, the number of columns being variable more or less as needed. An intermediate conduit duct 108 is mounted to withdraw fluid at an intermediate point through a duct 110, continuous with duct 108, and transfer the same to a point slightly above the bottom of the next succeeding reaction column 102 through a continuing duct section 112. Similarly a connecting duct 114 passes fluid from an intermediate height portion of a second column 102 by way of duct 116, continuous with duct 114, and transfers the suspension to a point slightly above the bottom of the next succeeding reaction column 106 by way of continuing duct section 118. Thus, the bottom of each reaction column following the first is connected by a duct with an intermediate height portion of the next preceding reaction column.

Fresh catalyst suspension, preferably $AlCl_3$ in a liquid, preferably liquid polymer formed in the process, is passed into the system through a point near the bottom of the first reaction column by way of duct 120; and preferably a promotor catalyst of HCl, is added through line 121 both of which may mix with fresh liquid feed stock as it passes into the column by way of duct 122. Reaction product is withdrawn from the last column 106 by way of a duct 124 from a similar intermediate level connecting duct 126, the flow in the system being forced by pump 128 which impels the liquid under a desired pressure in the system, usually about 0 to 150 p.s.i.g. for polymerization, through a recycle line 130.

This duct 130 is divided, a portion of the reaction mixture passing directly by way of line 132 to an inlet line 134 entering the column 100 at a point near to but above the bottom thereof as direct recycle. A second portion of the flow in line 130, as divided, passes through a line 136 entering an intermediate point of a settling tank 138, by way of duct 140.

The ratio of recycle directly returned through lines 130 and 134 to the first reaction column 100 to that which is withdrawn in line 136 for product separation is controlled by a throttling valve 142 usually set at a high direct recycle rate exceeding about 8 to 1, preferably about 10 to 1, that is, to pass about 10 volumes of liquid through lines 132 and 134 to 1 volume through line 136. The settling tank 138 is of sufficiently large diameter to allow settling of suspended catalyst therein by creating a relatively quiescent zone, and thereby allows formation in an upper portion A of relatively clear liquid from which the catalyst has settled; a relatively concentrated portion B in which the catalyst suspension is relatively concentrated; and a sludge zone C wherein heavy spent catalyst substantially free of suspending liquid collects. In continuous passage of reaction fluid into tank 138 from line 140, clear reaction product solution is continuously withdrawn from the zone A near the top of the settling tank by way of line 142' at a rate controlled by valve 144 and may then be treated further for product recovery by procedure such as described in the Jackson application above and which forms no part of this invention.

A concentrate of suspended catalyst is withdrawn from a point near the bottom of zone B by way of line 146 and returned to the lower end of the first reaction column 100 at a level such as indicated by the duct 148.

In operation the flow and reaction of reagents take place through the several columns 100, 102 and 106, etc., the fluid flowing from the bottom upward in the first column 100, entering from inlet ducts 120, 122, 148 and 134 to a sufficient height to form a substantial hydrostatic head therein above the outlet level 110, for example, at a level indicated by the dotted line 150. The fluid under hydrostatic pressure passes out of that column through the intermediate duct 108 and enters the bottom of the second column 102 through inlet 112. There it reaches a hydrostatic head indicated by the line 152, slightly less than that of 150. It leaves column 102 from the intermediate level duct 116 by way of line 114, entering column 106 at its lower level of duct 118, and there too, forms a hydrostatic head of liquid at a height indicated by dotted line 154. The fluid there leaves at the intermediate height of outlet duct 126, passing to the suction of pump 128 by way of line 124 which recycles all of the fluid in line 130 by way of lines 132 and 146, except that withdrawn for product recovery through line 142', the greater portion of reaction mixture in line 130 being recycled through lines 132 and 134, and the lesser portion through line 136 to the settling tank, and thence by way of lines 146 and 148 to the reaction column 100.

The hydrostatic levels of reaction mixture indicated by dotted lines 150, 152 and 154 are maintained by throttling of valve 144 in line 142' at the product recovery outlet of settling tank 138 by liquid level controller 156. That level controller 156 comprises a float controller making electrical contact through switch box 158, preset to the desired liquid level to be maintained, and correspondingly throttles valve 144 for greater or smaller product withdrawal from the system to maintain that level.

Each of reaction columns 100, 102 and 106, etc., open at their tops into horizontal vapor condensation tank 160 which preferably is a single horizontal tank in which is mounted a bank of refrigeration coils 162. These refrigeration coils interconnect with a source of liquid refrigeration fluid, for example, ammonia, passed therein by way of line 164 impelled by a liquid refrigerant pump 165. A return duct 166 carries warm refrigerant liquid and vapors from coils 162 to liquid and vapor refrigerant receiver 167, any liquids therein being deflected by baffle 168 to the bottom of the receiver.

Refrigerant vapors in the receiver leave at the top through line 169, passing to a standard gas compressor 170, by way of line 171. The gas compressor 170 is operated at a speed, varied as needed by the system, by a fuel injection engine (not shown) whose speed in turn is variable with its fuel supply passing through line 173. A valve 172 in line 173 throttles the fuel supply therein responsive to the suction pressure of refrigerant gas passing to the compressor in line 171, as communicated by a sensing line 174 which connects line 171 with a control valve 172 in line 173 according to known valve construction. Compressed refrigerant is passed to condenser 175 by way of line 176, and the liquified refrigerant is stored in receiver 177 to which it passes by way of line 179. Liquid refrigerant passes by way of line 181 to the bottom of receiver 167, which stores the liquid refrigerant in its bottom up to an intermediate level controlled by a level controller 183 which operates by throttling valve 185 in line 181, responsive to the desired liquid refrigerant level in receiver 167. Liquid refrigerant passes from receiver 167 to the suction of refrigerant pump 165 by way of line 187.

In principle, the system operates by control of refrigerant gas pressure and consequently the temperature at which it is vaporized. For this purpose, the gaseous refrigerant, such as ammonia, leaving the top of receiver 167 has its pressure built up by a valve 189 whose setting is responsive to a desired temperature to be maintained in the reactor. That temperature is set by thermostat 178. A thermocouple 180 mounted in a position to sense the actual temperature within the reactor in turn controls thermostat 178, set at a temperature to be maintained. As that set temperature is more or less the actual temperature to be maintained, the setting of valve 189 through sensing line 191 is constricted or enlarged to vary the refrigerant gas pressure in the system. That pressure on the refrigerant vapor, hence the temperature at which the refrigerant boils, controls the quantity of heat that is removed from the system. The variation in temperature of the cooling medium controls its delta temperature or heat exchange (cooling force) across the cooling tubes 162. In consequence, the cooling system here described is one wherein liquid refrigerant is pumped through heat exchanger coils 162, and to vary the temperature and produce the cooling desired in the tank 160, the temperature of the refrigerant is varied by varying the pressure on the refrigerant vapors.

When settled catalyst sludge accumulates in the bottoms of reactors 100, 102 and 106, as well as settling tank 138, it may be withdrawn by blowing-down the bottoms through lines 182, 184, 186 and 188 respectively. For this purpose it is necessary to open the corresponding valve in each line only momentarily, the system usually being under positive pressure, so that a few inches of accumulated sludge is forced out of the bottoms of the respective columns. The same result may be obtained by application of extraneous blow-down means, such as by installing an inert gas line (not shown) applied above each blow-down line to eject the catalyst sludge from the system when the system is not otherwise under positive pressure.

In overall operation of the reactor a suspension of catalyst, usually in a controlled particle size, as pointed out in the copending Jackson application above, together with fresh feed and catalyst in line 122 and about 10 times that quantity of recycle from lines 134 and 148 enter the first reactor 100 at a velocity at least as great as the settling rate of catalyst solids suspended therein, that is, sufficient to maintain the catalyst suspended by the upward flow thereof in the column 100. This upward velocity in practical operation usually exceeds the settling rate by 10 to 300%, variable to control the actual time the reaction mixture is to remain in the reactor in continuous flow. When the height of the liquid in that column has reached a sufficient hydrostatic head, such as at about the level 150, the fluid suspension of the catalyst passes through line 108, entering in the bottom of column 102, passing upward therein until it reaches a level of hydrostatic head at about the line 152. In turn the liquid leaves column 102 under its hydrostatic head pressure through line 114 entering the bottom of the next succeeding column 106, again reaching a hydrostatic head level 154.

In passing through column 100 reaction of components in the liquid mixture takes place developing heat exothermically and vaporizing part of the solvent or liquid reaction medium, such as the liquified $C_1-C_5$ hydrocarbon. Accordingly the reaction medium in column 100 will be such as to approximately evaporate a sufficient quantity of its liquid component to absorb as heat of evaporation the exothermic heat released by the reaction. The reaction continues in column 102 still releasing heat and evaporating part of its reaction medium, and again reaction continues in column 106 or succeeding columns, as such may be used. The vapors produced by the evaporating reaction medium contact cooling coils 162, are condensed thereon to liquid by the heat exchange, and are returned as liquid reflux dropping back into the top of each column.

The temperature of the refrigerated coils 162 are maintained to return cooled liquid reflux at a temperature adjusted to cool the reaction medium to the temperature desired. That temperature is set by thermostat 178 which correspondingly adjusts the temperature of the refrigerant flowing through the coils 162 as explained above. Thereby the temperature is maintained in the reaction mixture by direct evaporation of liquid components thereof and further admixture with controllably cooled returning reflux. Simultaneously the solvent reagent concentration is not changed because all of the evaporated liquid is maintained in the system, being continuously returned thereto as reflux, except of course such quantity of liquified reaction components as are converted in the reaction to non-volatile substances, such as polymer.

The pump 128 maintains a desired rate of recycle and consequent flow rate through the reactor whereby the suspended catalyst will not settle in view of the adjusted vertical or upward flow velocity maintaining the catalyst suspended. As stated, that upward flow rate may be more rapid than needed to maintain the catalyst suspended, thereby allowing considerable variation in catalyst particle size. The length of time in which the components comprising the reaction mixture are present in the reactor is adjusted somewhat by the flow rate established by the recycle pump 128 but is also adjusted by varying the height and diameter of each column and by using more or fewer reaction columns to give the desired time of reaction in the reactor that may be needed. Moreover, the liquid level once established in the system, is maintained by level controller 156 controlling outlet valve 144, whereby a clear settled portion is withdrawn from the system for product recovery, respectively to the level established by the recycle rate and the input of fresh feed. Approximately the quantity withdrawn for reaction product recovery is the same as the fresh feed except for reduction in volume by reaction to form the desired product such as polymer and for initial operations and surging flow until the system is in balance at a desired level.

For purposes of using this reactor for producing polyisobutylene as pointed out in the Jackson application, it is preferred to adjust the total recycle to fresh feed at greater than 8 to 1 and preferably at least 10 to 1. Operating such a system for producing polyisobutylene from a $C_1-C_5$ liquified hydrocarbon feed containing about 3 to 75% of polymerizable olefines, preferably isobutylene, and using solid particles of anhydrous aluminum chloride as catalyst, sized in the range to pass 40 mesh screen and be retained on a 200 mesh screen U.S.S. sieve, and using the present reactor, allows consumption of usually less than about 0.1% of catalyst per pound of raw hydrocarbon feed to the reactor and is usually in the range of 0.01 to 0.1%, together with less than an equal amount of hydrochloric acid gas supplied in the same quantity range with the aluminum chloride for promotion thereof. In general, the reaction temperature is in the range of $-40$ to $+65°$ F., the pressure is sufficient to maintain the $C_1-C_5$ hydrocarbon gases liquified usually from 0 to 150 p.s.i.g. and the polyolefine will vary in molecular weight from about 450 to 1500 and the viscosity from about 100 to 20,000 SSU at 210° F. The actual control of the M.W. and viscosity is available by control of the temperature, the lower temperature producing the heavier polymer.

The temperature of the present system operated with this reactor is easily maintained by the described controls to be substantially constant; the flow rate through the reactor is easily adjusted to prevent active solid catalyst particles from settling, with little liquid entrainment by vapors, and while allowing a small quantity of heavy spent liquid catalyst sludge to settle in the bottom of each reactor for occasional blow-down as needed.

Inert or unreacted liquified gas components are maintained in the system for final recovery with the product while being continuously retained in the reactor by evaporation, condensation and reflux back into the reaction mixture without loss, serving to maintain the concentration of the reaction mixture with respect to volatile components relatively constant and which are recoverable from the final product.

As indicated, the actual dimensions of the reactor are determined by the time in which the material is to be maintained therein. A higher recycle rate generally allows a larger diameter reaction column because of the increased upward velocity to maintain the reaction suspended.

The following example illustrates operation of this reactor for production of polybutene.

*Example*

A raw liquified feed gas comprising about 55% butanes, about 25% butenes and about 16% isobutylenes, the balance, about 4%, being other $C_1$-$C_5$ hydrocarbon gases, is passed together with 90% recycle of the reaction product to the bottom of the first leg of the reactor as herein described, comprising the reaction column 100, at a rate to establish an upward velocity component of 0.3 feet per second. Simultaneously therewith the raw feed is charged with about 0.08 weight percent thereof of aluminum chloride particles screened to pass a 40 mesh screen and be retained upon a 200 mesh screen, preferably averaging about 65 mesh, and which the particles are predominantly in the range of 40 to 150 mesh together with 0.05 weight percent of the raw feed of hydrochloric acid gas. The settling rate of this catalyst is about one-half the vertical component of velocity, that is, about 0.15 foot per second in the same feed. The pressure on the system is maintained at about 22 p.s.i.g. and the temperature of the reaction mixture is set to be maintained at 58° F. and the raw feed stock is precooled to the temperature before entering the reactor. The reaction product withdrawn from the third leg 106, is divided with the predominantly larger flow passing through line 132 for direct recycle and a relatively minor quantity, about 20% by volume, withdrawn through line 136 and passed to an intermediate height portion of the settling tank. The catalyst suspension in the settling tank concentrates in the intermediate area B, producing a clear supernatant solution at the top which is withdrawn through line 142' for further recovery. A concentrtae of catalyst suspension is withdrawn through line 146 and returned as additional recycle to the bottom of the reactor 100. The total (combined) recycle in lines 134 and 148 entering the reactor is in ratio of 10 to 1 with respect to the fresh hydrocarbon fed to the reactor. The corresponding quantity of reaction product is withdrawn from the system through line 142'. Analogously, a corresponding quantity of spent catalyst to that supplied to the system through line 120, is withdrawn from the bottom of the reactors and settling tank. Operating according to this example, 60 barrels of polyisobutylene per day is recovered with a consumption of about one pound of aluminum chloride per barrel, the polymer having a viscosity of 1000 SSU at 210° F. By operating under the same conditions except changing the temperature to 10° F. and 0 p.s.i.g., the polymer produced has a viscosity of 20,000 SSU.

As indicated, variations from these reaction conditions may be followed to produce polyisobutylenes of variable viscosity. The catalyst may be used in larger quantity, less economically; the flow rate through the reactor is critical merely to the extent that the upward component velocity through each vertical reactor leg must exceed the settling rate of the catalyst; and a larger diameter of each leg will necessarily have a lower vertical component of velocity.

It will be apparent to one skilled in the art that the present reactor can be modified for maintaining the temperature of other reactions constant including use of other catalysts. This reactor is particularly designed to maintain the temperature relatively constant for an exothermic reaction, to allow such reactions to be effected wtih solid catalysts suspended in a liquid, wherein the catalyst may be continuously moved with the reaction components through the reactor, and has great advantage in that the solid catalyst may be used in such system without settling and clogging in the system.

The reactor may have additional legs of various heights added, or a lesser number may be used, depending upon the time of reaction desired in the reactor. The recycle ratio through the reactor may be varied as well as the temperature maintained therein. If desired individual reactors may each have separate refluxing refrigerating units mounted thereabove with, however, substantial loss of efficiency in unitary temperature control.

It is accordingly intended that the drawing and example set forth herein be regarded as illustrative and not limiting except as defined in the claims appended hereto.

We claim:

1. Reactor comprising a series of elongated vertical columns interconnected by ducts for flow of reaction liquids entering at a point near the bottom of one column and leaving at a substantially higher point after rising in normal flow through the column, the outlet of each column being interconnected by a duct to an inlet near the bottom of the next succeeding column of the series, and duct means for withdrawing the liquid reaction mixture from the outlet of the last column and recycling a substantial portion thereof to the inlet of the first column of the series, the several vertical reaction columns being in open communication at their tops with a vapor condenser, the vapor condenser comprising cooling coils overlying the entire series of open top reaction columns for condensing and for direct return of condensed vapors thereto as reflux.

2. The reactor defined in claim 1 wherein the last column has a liquid level controlling means in the outlet thereof whereby to allow withdrawal of liquid reaction product therefrom at a height below the upper liquid level therein, said liquid level controller maintaining a desired reaction liquid level in the entire series of reactors.

3. The reactor as defined in claim 1 wherein each of the vertical columns has valve and duct means in the bottom thereof for withdrawing spent catalyst sludges accumulated therein by settling from the column.

4. The process of polymerizing exothermically polymerizable hydrocarbon components in a liquified $C_1$-$C_5$ hydrocarbon mixture containing at least 3% of isobutylene in the presence of acid promoted aluminum chloride particles suspended in said liquified gaseous reaction mixture, comprising passing the said liquified catalyst suspension vertically upward through each of a series of vertical reaction zones at a rate sufficiently rapid to maintain said catalyst particles in suspension, the suspension entering at a point near the bottom of the first zone, leaving at a substantially higher point of said zone and passing to a point near the bottom of the next zone of said series of reaction zones, whereby heat is exothermically evolved by the reaction of the moving suspension in each of the said reaction zones as polymerization takes place, the evolved heat vaporizing liquid components of the said reaction mixture as solvent vapors, the said solvent vapors being evolved at the top of each of the vertical reaction zones, cooling and condensing said solvent vapors above the reaction zones to remove the exothermic heat of reaction and directly returning the liquid condensed to the top of each reaction zone as reflux, thereby recovering said vapors and cooling the reaction mixture in each zone in continuous passage therethrough, withdrawing the reaction mixture from a high point level of the last reaction zone, recovering a portion of the reaction product therefrom, and recycling the remainder together with fresh feed to the inlet of the first reaction zone.

References Cited in the file of this patent

UNITED STATES PATENTS

| | | |
|---|---|---|
| 10,850 | Halvorson | May 2, 1854 |
| 1,766,363 | Wecker | June 24, 1930 |
| 1,934,309 | Hoover | Nov. 7, 1933 |
| 1,935,627 | Falter | Nov. 21, 1933 |
| 2,085,524 | De Simo et al. | June 29, 1937 |
| 2,246,703 | Thiele et al. | June 24, 1941 |
| 2,366,627 | Kemp | Jan. 2, 1945 |
| 2,474,583 | Lewis | June 28, 1949 |
| 2,571,354 | Fontana | Oct. 16, 1951 |
| 2,588,358 | Carlson et al. | Mar. 11, 1952 |
| 2,677,002 | Yahnke et al. | Apr. 27, 1954 |
| 2,697,694 | Shalit et al. | Dec. 21, 1954 |
| 2,726,231 | Field et al. | Dec. 6, 1955 |
| 2,957,930 | Jackson | Oct. 25, 1960 |